United States Patent
De Coi

(10) Patent No.: US 7,830,532 B2
(45) Date of Patent: Nov. 9, 2010

(54) DOOR/GATE MONITORING SENSOR DEVICE

(75) Inventor: Beat De Coi, Sargans (CH)

(73) Assignee: Cedes AG, Landquart (CH)

( * ) Notice: Subject to any disclaimer, the term of this patent is extended or adjusted under 35 U.S.C. 154(b) by 56 days.

(21) Appl. No.: 12/132,938

(22) Filed: Jun. 4, 2008

(65) Prior Publication Data

US 2008/0304039 A1 Dec. 11, 2008

Related U.S. Application Data

(63) Continuation of application No. PCT/EP2006/011478, filed on Nov. 30, 2006.

(30) Foreign Application Priority Data

Dec. 5, 2005 (DE) .................. 10 2005 058 094
Oct. 23, 2006 (DE) .................. 10 2006 050 303

(51) Int. Cl.
*G01B 11/14* (2006.01)
(52) U.S. Cl. ...................... 356/622; 356/4.1
(58) Field of Classification Search ............. 356/4.1, 356/5.09, 5.11, 622
See application file for complete search history.

(56) References Cited

U.S. PATENT DOCUMENTS

| | | | |
|---|---|---|---|
| 3,652,161 A | 3/1972 | Ross | |
| 4,812,035 A | 3/1989 | Freedman et al. | |
| 4,888,490 A | 12/1989 | Bass et al. | |
| 4,894,952 A | 1/1990 | Trett et al. | |
| 5,017,921 A | 5/1991 | McGill et al. | |
| 5,122,796 A | 6/1992 | Beggs et al. | |
| 5,243,181 A | 9/1993 | Bondarev et al. | |
| 5,250,801 A | 10/1993 | Grozinger et al. | |
| 5,250,810 A | 10/1993 | Geiger | |
| 5,699,151 A | 12/1997 | Akasu | |
| 6,888,640 B2 | 5/2005 | Spina et al. | |
| 2003/0127586 A1 | 7/2003 | Maruyama | |
| 2004/0135992 A1 | 7/2004 | Munro | |

FOREIGN PATENT DOCUMENTS

| | | |
|---|---|---|
| DE | 40 31 142 A1 | 4/1992 |
| DE | 42 15 817 C1 | 3/1993 |
| DE | 195 23 528 A1 | 2/1996 |
| DE | 196 44 565 A1 | 4/1998 |
| DE | 198 15 149 A1 | 10/1999 |
| DE | 100 22 215 A1 | 11/2001 |
| DE | 101 56 736 A1 | 6/2003 |
| DE | 103 14 581 A1 | 10/2004 |
| EP | 1 306 693 A1 | 5/2003 |
| WO | 02/084220 A2 | 10/2002 |

*Primary Examiner*—Tarifur Chowdhury
*Assistant Examiner*—Michael LaPage
(74) *Attorney, Agent, or Firm*—Burr & Brown

(57) ABSTRACT

The invention proposes a sensor array having a plurality of sensor devices comprising a source of electromagnetic radiation, a receiver for the electromagnetic radiation and a control device, the control device being designed to use the source to emit electromagnetic radiation and being designed to determine a distance covered by electromagnetic radiation, which is emitted by the source, from a reflection surface of an object to the receiver by evaluating the reflected radiation. According to the invention, the sensor devices of the plurality of sensor devices operate at different frequencies or using time-division multiplexing. The invention also proposes a sensor device for a sensor array, the control device being designed to measure the distance at different frequencies or using time-division multiplexing.

19 Claims, 2 Drawing Sheets

DOOR/GATE MONITORING SENSOR DEVICE

CROSS REFERENCE TO RELATED APPLICATIONS

This application is a continuation of International Application No. PCT/EP2006/011478, having an international filing date of Nov. 30, 2006, and claims the benefit under 35 USC §119(a)-(d) of German Application No. 10 2005 058 094.7, having a filing date of Dec. 5, 2005 and German Application No. 10 2006 050 303.1, having a filing date of Oct. 23, 2006, the entireties of which are incorporated herein by reference.

FIELD OF THE INVENTION

The invention relates to a sensor array and to a sensor device comprising a source, for example, electromagnetic radiation, in particular light, a receiver for the electromagnetic radiation and a control device.

BACKGROUND OF THE INVENTION

TOF sensors (Time of Flight sensors) emit light and use the reflected light to determine the distance covered by the light from a reflection surface back to the sensor. This can be achieved, for example, by measuring the time required by a light pulse to pass from a source, via a reflection surface, back to the sensor. Another possibility is to modulate an oscillation onto the light and to compare the phase of the oscillation of light which has been reflected back with the phase of light which has been emitted. The length of the light path can be determined from the phase difference with knowledge of the modulation frequency.

Such sensors can be used to monitor, for example, door systems, for example of an elevator, in order to prevent items or people getting caught in the door.

SUMMARY OF THE INVENTION

The invention is based on the object of extending the field of use of sensors of the type described in the introduction, in particular of being able to operate them such that they are less susceptible to interference.

The invention is based on a sensor array having a plurality of sensor devices, the sensor devices each comprising a source of, for example, electromagnetic radiation, in particular light, a receiver for the electromagnetic radiation and a control device, the control device being designed to use the source to emit electromagnetic radiation and being designed to determine a distance covered by electromagnetic radiation, which is emitted by the source, from a reflection surface of an object to the receiver by evaluating the reflected radiation. The essence of the invention is that sensor devices of the plurality of sensor devices operate at different frequencies.

This procedure makes it possible to operate a sensor array having at least one further sensor device, if appropriate a plurality of further sensor devices, whilst avoiding measurement errors caused by mutual influence.

This procedure is based on the knowledge that a sensor device of the type described in the introduction only functions reliably when precisely that electromagnetic radiation which was also emitted by the sensor device is evaluated as the radiation which has been reflected back. This principle may be disrupted if a further sensor likewise emits light which is misinterpreted when evaluating the sensor in question. As a result, it may become difficult or even impossible to determine a correct distance from the sensor to a reflection surface. For example, the situation may arise in which the sensor in question evaluates the electromagnetic radiation which is emitted by an adjacent sensor and reaches the sensor in question via a reflection surface. The distance to the object, which is determined from this, is usually not the correct distance. According to the invention, this is avoided by using different frequencies. In principle, it is also possible to operate the sensor devices using time-division multiplexing.

The different frequency may relate either to the modulation frequency of the electromagnetic radiation or else to the carrier frequency itself or may relate both to the modulation frequency and to the carrier frequency. Both measures make it possible to avoid mutual influence of sensor devices.

Time-division multiplexing makes it possible to avoid measurements being carried out simultaneously or in overlapping fashion in the case of two adjacent control devices, for example, with the result that one sensor cannot be disrupted by another during the measurement.

In one case, an input and an output of a sensor device may be provided for this purpose. The output can be used to provide an adjacent sensor device with a signal which signals to the adjacent sensor device that the sensor device is carrying out a measurement and therefore the adjacent sensor device should not carry out a measurement itself.

The sensor device may receive a corresponding signal from an adjacent sensor device at the input. This makes it possible to control the sensor devices in such a manner that a simultaneous measurement, with the risk of undesirable interference, can be avoided.

Specifically, as long as one device is carrying out a measurement, a signal is applied to the corresponding output or input of the other sensor device, which signal signals to the other device that it should wait. As long as one sensor device is carrying out a measurement, another device waits for a randomly determined period of time, for example, before starting another measurement. In this manner, all sensor devices are equally provided with the option of carrying out a measurement.

An input or output may be designed for electrical communication, optical communication or other types of wired or wireless communication.

In another preferred refinement of the invention, before an actual measurement is carried out, a control device carries out a measurement without emitting light. If this control device receives a signal, it is clear that another control device is carrying out a measurement. The control device which has carried out the "test measurement" will then repeat the test measurement after a predefined or randomly determined period of time and, if this test is positive, will start the actual measurement. It is likewise conceivable for the electromagnetic radiation emitted by a sensor device, in particular light, to contain a code. For example, the emitted signal contains signal sections, in particular periods, with reduced intensity. As a result, sensor devices can communicate with one another without significantly disrupting the performance of the actual measurement. Coding using a serial number makes it possible for sensor devices to gather the information relating to the number of devices which are active in a detection area. If a measurement comprises a plurality of exposure operations, the information relating to the time at which the measurement will be ended may be put into the duration of the exposure operation.

In a refinement which is furthermore preferred, the sensor device is able to adapt the measuring time in a measurement cycle on the basis of the number of further sensor devices present. For this purpose, the sensor device may detect, in an adaptive process, whether other devices are simultaneously carrying out distance measurements and, if so, how many other devices are simultaneously carrying out distance measurements. For example, on the basis of an infrared illumination operating cycle of 0.5, a second device may correspondingly shift its measuring time duration by half an operating cycle into the free period of time in an adaptive manner. A third device will first of all determine that there is no measuring time duration available before the third sensor device indicates to the others, for example by means of periodic interference, that they must shorten their operating cycle.

According to the number of sensor devices involved, this operation may be repeated and may result in a correspondingly divided measuring time duration for the individual sensor devices. This procedure automatically reduces the measuring time duration with respect to a complete cycle, in which more than two sensors may overlap. In the case of two sensors, the measuring times are preferably only matched to one another, as described above, without this resulting in a reduction in the measuring time duration.

Another fundamental aspect of the invention relates to a sensor device which comprises a source of, for example, electromagnetic radiation, in particular light, a receiver for the electromagnetic radiation and a control device, the control device being designed to use the source to emit electromagnetic radiation and being designed to determine a distance covered by electromagnetic radiation, which is emitted by the source, from a reflection surface of an object to the receiver by evaluating the reflected radiation. The essence of the sensor device is that the control device is designed to measure the distance at different frequencies or using time-division multiplexing.

As a result of this measure, the sensor device itself makes it possible to avoid undesirable interference. This simplifies the array of a plurality of sensor devices which are intended to operate alongside one another without interference. In this case, it is not necessary for the sensor devices to be already configured during their manufacture in such a manner that interference does not arise. Rather, interference can be determined at the installation location and can be eliminated using suitable measures, for example by setting the sensor devices to different frequencies in the case of the array comprising a plurality of sensor devices.

The modulation frequency can preferably be changed. However, it is also conceivable for the carrier frequency to be changed by the control device.

The frequency can be tuned, for example, by means of a DIP switch, an externally supplied signal or automatically. In one advantageous refinement of the invention, the control device has at least two light sources, which operate at different frequencies, for this purpose. Depending on requirements, it is then possible to change over between the light sources.

In another particularly preferred embodiment of the invention, when another sensor device is present, the control device is designed to look for an operating mode in which the superimposition of measurements can be prevented. If, for example, one sensor device detects another sensor device which operates at the same frequency, for example the modulation frequency, this procedure makes it possible for the control device to look for another modulation frequency at which superimposition by the detected sensor device can be avoided.

The frequency of an oscillator in a sensor device can, in principle, be set using software. When started up, each sensor device can carry out measurements without emitting light. If a signal is received, this device does not wait for its turn but rather changes its modulation frequency for the measurement. If it checks a frequency and determines that said frequency is not being used by another device, it can carry out an actual distance measurement at this frequency.

In order to be able to reliably and effectively delimit the frequency with respect to other sensor devices, the text below proposes varying the frequency during a distance measurement. For example, during a predefined measuring time, for example 20 ms, the frequency is changed every 100 µs, for example. It is also conceivable to continuously change the frequency. Harmful overlapping by a frequency which is being used by another sensor device will therefore occur only in a comparatively small measurement interval, which does not have a significant effect on the overall measurement. This also applies, in particular, when the other sensor device or devices operate(s) according to the same principle unless the other sensor device or devices change(s) the frequency in an exactly synchronous manner, which can be excluded, however, by introducing a random aspect.

If the frequency remains constant during a time period of a distance measurement, this time period should preferably be shorter than the duration of the measurement, for example more than 10 times shorter, preferably more than 100 times shorter and, in an even more optimized case, more than a thousand times shorter. The time period may also be only approximately one period of the signal which is modulated onto the carrier signal.

In this case, the frequency change may be 1%, preferably 5% and, in an even more optimized case, more than approximately 10%.

The greater the frequency differences, the shorter the measuring time required for an interference-free measurement result.

In order to avoid two or more sensor devices synchronously changing the frequency, it is proposed that a first frequency can be arbitrarily selected.

In addition, it may be preferred for the frequency to be alternatively or additionally changed arbitrarily.

In one particularly preferred refinement of the invention, the control device is designed to carry out a measurement without emitting light in order to check whether signals at particular frequencies are present, and a first frequency is selected on the basis of whether or not the frequency is present, if appropriate on the basis of the time at which the frequency is detected. A frequency which is always identically predefined and can be used to identify a sensor device is preferably used in each measurement. The frequency can then be changed more than 10 times, preferably more than 100 times and, in a further optimization, more than 1000 times during a distance measurement.

In one simple embodiment, it is conceivable for the frequency to be able to be set manually. One simple setting possibility is also to automatically change the frequency after a predefined amount of time. The frequency can be set manually using switches, for example DIP switches. This also makes it possible to set the time after which the frequency is automatically changed.

A change in the frequency can also be made dependent on the extent to which interference is detected during a test. The frequency may be varied to a lesser extent if less interference is detected.

In order to avoid superimposition, the text below proposes that a receiver can be matched to the frequency of the emitted light. For example, the receiver can only evaluate signals in a narrow frequency range, whereas signals at other frequencies are disregarded.

A distance measurement is unambiguous or ambiguous depending on the frequency range of the signal modulated onto a carrier signal. If the distance from the transmitter, via the object, back to the receiver is greater than the wavelength of the signal which has been modulated on, the measurement is ambiguous. However, the measurement is more accurate in the case of a shorter wavelength. In order to obtain an accurate measurement, a first measurement can first of all be carried out at frequencies in a first frequency range and a second measurement can be carried out at frequencies in a second frequency range, the first frequency range being selected in such a manner that it provides an accurate but ambiguous measurement, but the second frequency range enables unambiguous measurements. Superimposition of the two measurements then provides an unambiguous and accurate measurement. An unambiguous measurement can also be achieved by relating two ambiguous measurements.

In one particularly advantageous refinement of the invention, the measurements are carried out in a frequency range which is matched to the distance to an object to be measured in such a manner that optimized measurement accuracy can be achieved with unambiguous measurement.

The frequency may be in an electromagnetic radiation range, for example radar or light. However, it is also possible for frequencies in the sound range to be used.

An array of a plurality of sensor devices is preferably accommodated in a housing.

BRIEF DESCRIPTION OF THE DRAWINGS

A plurality of exemplary embodiments of the invention are illustrated in the drawings and are explained in more detail below by specifying additional advantages and details.

DETAILED DESCRIPTION OF THE INVENTION

Figure 1:
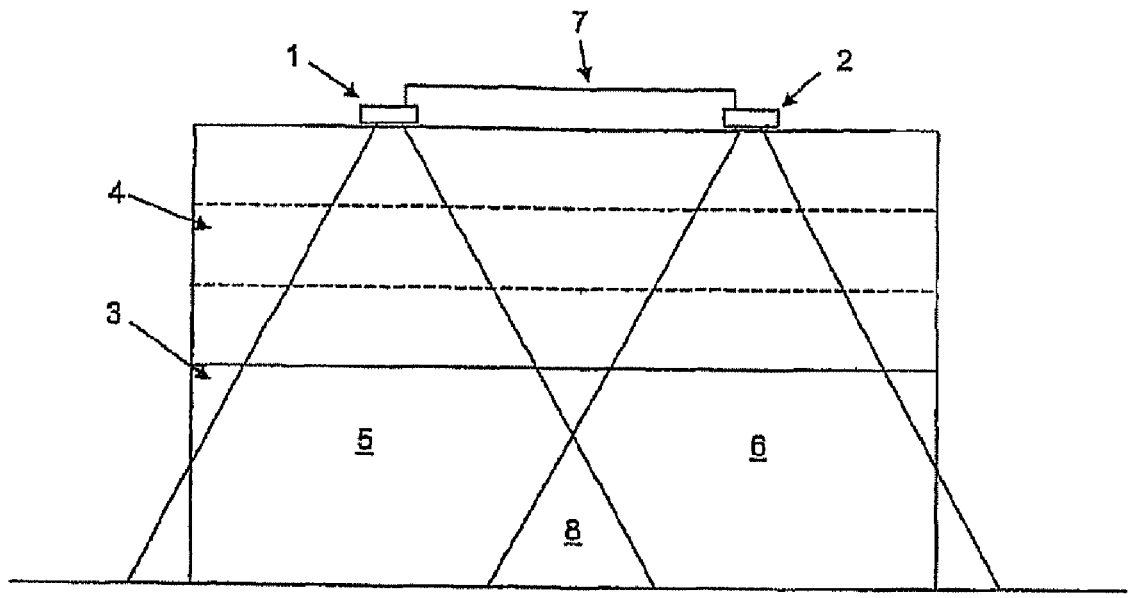
FIGS. 1 to 3 respectively show a schematic view of different embodiments of sensor arrays on a roller door.

FIG. 1 illustrates two sensor devices 1, 2. These sensor devices 1, 2 monitor a roller door 4 for opening and closing an opening 3. The sensors 1, 2 have monitoring areas 5, 6. The monitoring areas 5, 6 overlap in a central area 8. The overlapping area 8 may result in defective measurements which make it impossible for the sensor devices 1, 2 to operate reliably.

The sensor devices 1, 2 are electrically connected to one another by means of a connection 7. Internally, the connection connects an input or an output of each sensor (not illustrated). If the sensor device 1 would like to carry out a measurement, a check is carried out in order to determine whether a signal from the output of the sensor device 2, which indicates a current measuring operation of the sensor device 2, is applied to the input 1 of the sensor device 1. If this is the case, the sensor device 1 is preferably designed in such a manner that it enters a waiting position for a predefined, optionally random, period of time and then starts a measuring operation again if the input signals that the sensor device 2 is currently not carrying out a measurement. There is preferably no signal on the connection 7 from the respective sensor device until a further measurement is carried out, that is to say until the next illumination phase. This may result from the fact that the respective sensor device is evaluating measured data or is quite simply in a waiting period. If both sensor devices operate in exactly the same manner, a simultaneous measurement will never result since each sensor device does not start a measurement as long as the other sensor device is active.

Figure 2:
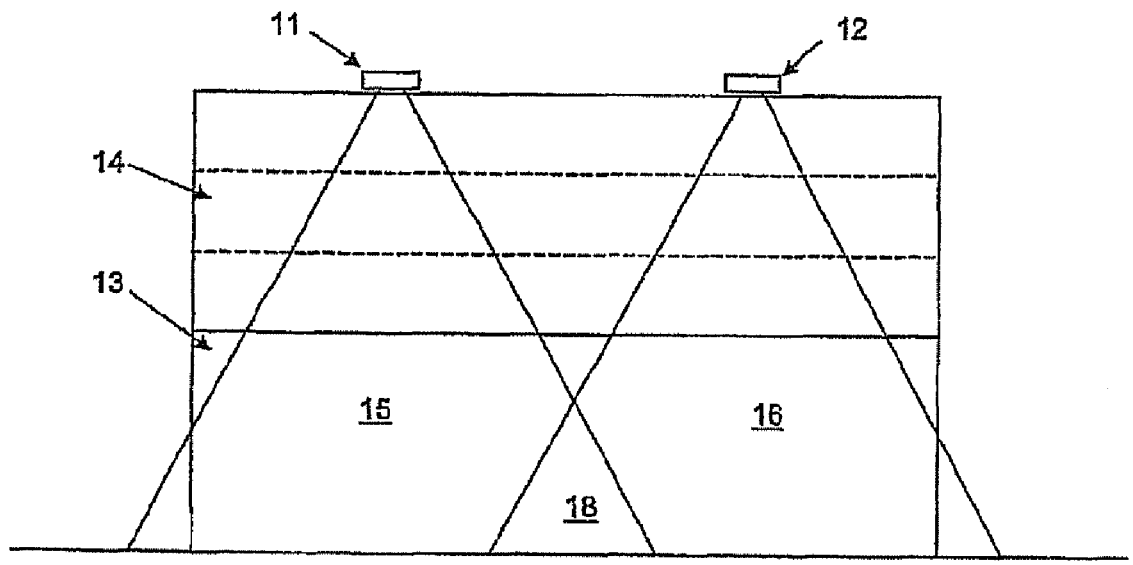

FIG. 2 illustrates another exemplary embodiment of the invention. Sensor devices 11, 12 are arranged above an opening 13, which can be closed using a roller door 14, in the lintel area of the opening. The sensor devices 11, 12 have a respective detection area 15, 16 which, however, overlap in an area 18. There is no electrical connection between the sensor devices 11, 12. Before a sensor device 11 or 12 starts an actual distance measurement, it first of all carries out a measurement without emitting light itself. If a signal cannot be measured, the measurement is continued with the actual distance measurement. Otherwise, the sensor device waits for a predefined or random period of time and then starts the measurement again without illumination, which is then followed by the actual distance measurement if an interfering signal cannot be determined.

Figure 3:
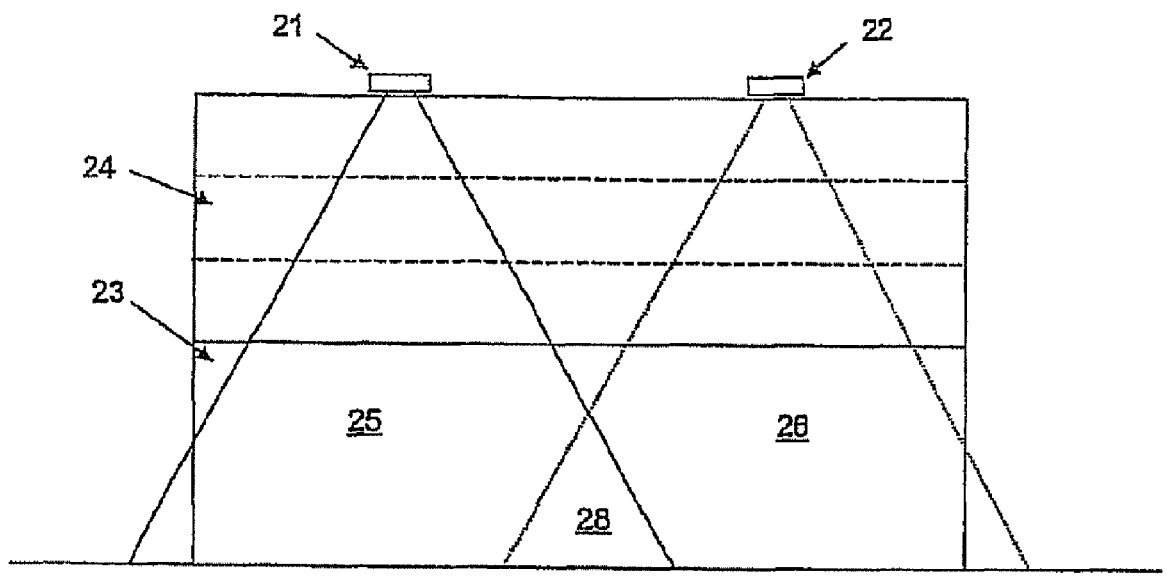

FIG. 3 illustrates two sensor devices 21, 22. These sensor devices 21, 22 monitor a roller door 24 for opening and closing an opening 23. The sensors 21, 22 have monitoring areas 25, 26. The monitoring areas 25, 26 overlap in a central area 28. In order to obtain reliable detection, the sensor devices 21, 22 use different modulation frequencies.

During a starting operation, the sensor devices 21, 22 wait for a random period of time. One of the sensor devices, for example the sensor device 21, has a shorter waiting time. Therefore, the sensor device 21 carries out a first test measurement, during which a measurement is carried out at an original modulation frequency but without illuminating the detection area 25. If no other signal is detected during this measurement, the sensor device 21 carries out a distance measurement at this frequency. After a waiting time, the sensor 22 likewise begins with a test measurement, a measurement being carried out at the same starting frequency but without illuminating the monitoring area 26. If the sensor device 21 is still operating at this point in time, the second sensor device 22 will detect a signal at the corresponding modulation frequency on account of the overlapping area 28 and will then change the modulation frequency. This is followed by a new test measurement which reveals that the actual distance measurement can be carried out at the new frequency. In the case of a multiplicity of sensors, this procedure can be repeated until a free frequency has been found.

FIG. 3 can also be interpreted to the effect that that there are two sensor devices 21, 22 with different carrier frequencies. The light emitted by one sensor device, for example the sensor device 21, has a wavelength of approximately 850 nm, for example. The emitted light may be amplitude-modulated or pulsed. A receiving section of the sensor device 21 (not illustrated) is only sensitive to a wavelength range of from 820 nm to 880 nm. The second sensor device 22 emits light at a wavelength of around 920 nm, its receiver only being sensitive to light in a frequency range of from 900 nm to 950 nm. It is evident that the sensor devices 21 and 22 will not interfere with one another as a result.

The figures only show two sensors even though the invention also "operates" in a corresponding manner for more than two sensors.

What is claimed:

1. A door/gate monitoring device having a sensor device comprising:
   a first source for emitting electromagnetic radiation;
   a receiver for receiving electromagnetic radiation; and
   a control device for selecting a first frequency for the electromagnetic radiation to be emitted from the source for emitting electromagnetic radiation;
   wherein, before emitting electromagnetic radiation, the sensor device determines whether signals are present that would interfere with the reception of the reflected electromagnetic radiation in a first frequency range that includes the first frequency, when signals are not present that would interfere with the reception of the reflected electromagnetic radiation in the first frequency range, the sensor device causes the first source for emitting electromagnetic radiation to emit radiation at the first frequency and determines a distance covered by the electromagnetic radiation emitted by evaluating reflected electromagnetic radiation from a reflection surface of an object received at the receiver for receiving electromagnetic radiation;

when signals are present that would interfere with the reception of the reflected electromagnetic radiation in the first frequency range, the sensor device changes the selected frequency for the electromagnetic radiation to be emitted from the first source for emitting electromagnetic radiation to a second frequency and determines whether signals are present that would interfere with the reception of the reflected electromagnetic radiation in a second frequency range that includes the second frequency, and when signals are not present that would interfere with the reception of the reflected electromagnetic radiation in the second frequency range, the sensor device causes the first source for emitting electromagnetic radiation to emit radiation at the second frequency and determine a distance covered by the electromagnetic radiation by evaluating reflected electromagnetic radiation from a reflection surface of an object received at the receiver for receiving electromagnetic radiation.

2. The door/gate monitoring device of claim 1, wherein the sensor device further comprises a second source for emitting electromagnetic radiation, wherein the first source for emitting electromagnetic radiation and the second source for emitting electromagnetic radiation emit electromagnetic radiation at different frequencies.

3. The device as claimed in claim 2, wherein the first source for emitting electromagnetic radiation and the second source for emitting electromagnetic radiation are light sources which operate at different frequencies.

4. The door/gate monitoring device of claim 1, wherein the control device changes a modulation frequency of the electromagnetic radiation.

5. The door/gate monitoring device of claim 1, wherein the control device changes a carrier frequency of the electromagnetic radiation.

6. The door/gate monitoring device of claim 1, wherein the control device varies a frequency of the electromagnetic radiation at least during a time period of a distance measurement.

7. The door/gate monitoring device of claim 1, wherein the control device maintains the frequency of the electromagnetic radiation constant at least during a time period of a distance measurement.

8. The door/gate monitoring device of claim 1, wherein the control device arbitrarily selects the first frequency for the electromagnetic radiation.

9. The door/gate monitoring device of claim 1, wherein the control device changes the frequency of the electromagnetic radiation to an arbitrarily selected frequency.

10. The door/gate monitoring device of claim 1, the sensor device further comprising manual setting means for selecting a frequency of the electromagnetic radiation.

11. The door/gate monitoring device of claim 1, wherein the control device automatically changes the selected frequency of the electromagnetic radiation after a predefined amount of time.

12. The door/gate monitoring device of claim 1, wherein the control device changes the frequency of the electromagnetic radiation on the basis of the extent to which interference is detected during a test.

13. The door/gate monitoring device of claim 1, wherein the receiver for receiving electromagnetic radiation and the first source for emitting electromagnetic radiation are matched to the frequency of the emitted electromagnetic radiation at the first frequency.

14. The door/gate monitoring device of claim 1, wherein the control device of the sensor device performs a first distance measurement in the second frequency range and a second distance measurement in a third frequency range, the measurement in the second frequency range providing an accurate but ambiguous measurement, and the second measurement in the third frequency range providing a measurement to remove the ambiguity from the first measurement.

15. The door/gate monitoring device of claim 1, wherein the control device determines the frequency to be selected on the basis of the distance to be measured.

16. The door/gate monitoring device of claim 1, wherein when electromagnetic radiation from another sensor device is present in a surrounding area, the sensor device determines an operating mode that prevents superimposition of measurements that would interfere with the reception of the reflected electromagnetic radiation.

17. The door/gate monitoring device of claim 1, wherein the control device of the sensor device is electrically connected to a control device of another sensor device, and prior to emitting electromagnetic radiation, the control device transmits a signal to the control device of the another sensor device to prevent the another sensor device from emitting electromagnetic radiation at the same time.

18. The device as claimed in claim 1, wherein the control device operates in a predefined mode when another sensor device emitting electromagnetic radiation at a different frequency is present in a surrounding area.

19. The door/gate monitoring device of claim 1, wherein the sensor device changes a modulation frequency and a carrier frequency of the electromagnetic radiation.

* * * * *